United States Patent
Norum et al.

(10) Patent No.: US 9,894,041 B2
(45) Date of Patent: Feb. 13, 2018

(54) SECURE DOMAIN NAME RESOLUTION IN COMPUTER NETWORKS

(71) Applicant: Microsoft Technology Licensing, LLC, Redmond, WA (US)

(72) Inventors: Bengt-Erik Norum, Duvall, WA (US); Mehmet Akcin, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 14/865,381

(22) Filed: Sep. 25, 2015

(65) Prior Publication Data
US 2017/0093802 A1    Mar. 30, 2017

(51) Int. Cl.
*H04L 29/06* (2006.01)
*H04L 29/12* (2006.01)

(52) U.S. Cl.
CPC ...... *H04L 63/0428* (2013.01); *H04L 61/1511* (2013.01); *H04L 61/6004* (2013.01)

(58) Field of Classification Search
None
See application file for complete search history.

(56) References Cited

U.S. PATENT DOCUMENTS

| | | | | |
|---|---|---|---|---|
| 6,961,783 B1* | 11/2005 | Cook | ................ | H04L 29/12066 709/223 |
| 7,280,519 B1* | 10/2007 | Shane | .................. | H04W 40/02 370/338 |
| 8,775,604 B2 | 7/2014 | Levow et al. | | |
| 2008/0022392 A1 | 1/2008 | Karpati et al. | | |
| 2010/0036959 A1* | 2/2010 | Trace | ................ | H04L 29/12066 709/228 |
| 2010/0125673 A1* | 5/2010 | Richardson | ....... | H04L 29/12066 709/239 |
| 2013/0085914 A1* | 4/2013 | McPherson | ......... | H04L 61/1511 705/34 |
| 2013/0198065 A1* | 8/2013 | McPherson | ......... | H04L 61/1511 705/40 |
| 2014/0280305 A1* | 9/2014 | James | ................. | H04L 61/1511 707/769 |

FOREIGN PATENT DOCUMENTS

CA    2822185 C    4/2014

OTHER PUBLICATIONS

Arends, et al., "DNS Security Introduction and Requirements", In the Internet Society, Mar. 1, 2005, 21 Pages.
(Continued)

*Primary Examiner* — Kaveh Abrishamkar
(74) *Attorney, Agent, or Firm* — Liang IP, PLLC

(57) ABSTRACT

Various techniques for improving privacy and security of domain name systems are disclosed herein. In one embodiment, a method includes transmitting, from a client device, a DNS query containing a domain name to a caching server for resolving the domain name. The domain name includes a first part having an encrypted request and a second part having an unencrypted network resource identifier. The method also includes receiving, at the client device, a DNS response from the caching server in response to the transmitted DNS query. The received DNS response containing an encrypted reply to the encrypted request in the first part of the domain name associated with the DNS query.

20 Claims, 11 Drawing Sheets

(56) References Cited

OTHER PUBLICATIONS

Hardaker, et al., "Anonymizing and privatizing requests and responses in the DNS", Internet Engineering task Force, ietf; Standard Working Draft, Internet Society, Apr. 1, 2014, 6 Pages.
Hu, et al., "Dns over TIs: Initiation and Performance Considerations", In the Internet Engineering Task Force, Ietf; Standard Working Draft, Internet Society, Sep. 15, 2015, 18 pages.
"International Search Report and Written Opinion Issued in PCT Application No. PCT/US2016/052366", dated Nov. 29, 2016, 11 Pages.
Shulman, et al., "Pretty Bad Privacy: Pitfalls of DNS Encryption", In the Proceedings of the 13th Workshop on Privacy in the Electronic Society, Nov. 3, 2014, pp. 191-200.
Zuo, et al., "Approach on Encrypting DNS Message Over UDP", Published on: Jul. 2, 2015, Available at: https://tools.ietf.org/html/draft-zuo-dprive-encryption-over-udp-00.
Hoffman, P.,"Wrapping DNS for Traffic Protection draft-hoffman-dns-last-hop-00", Published on: Dec. 5, 2010, Available at: https://tools.ietf.org/html/draft-hoffman-dns-last-hop-00.
"DNS Poisoning, Aka Pharming, Makes the Headlines in November's News", Published on: Dec. 2011, Available at: http://poland.emc.com/collateral/fraud-report/11624-online-fraud-report.pdf.
Osterweil, et al., "Opportunistic Encryption with DANE Semantics and IPsec: IPSECA", Published on: Jul. 6, 2015, Available at: https://tools.ietf.org/html/draft-osterweil-dane-ipsec-03.
Faltstrom,et al., "The Uniform Resource Identifier (URI) DNS Resource Record", Published on: Jun. 2015, Available at: http://www.rfc-editor.org/rfc/rfc7553.txt.
Murakami, et al., "Implementation and Evaluation of Encrypted Communications between DNS Clients and Servers", In Research Report, vol. 42, Dec. 20, 2008, pp. 57-62.
Holmes, David, "The Dynamic DNS Infrastructure", In White Paper, Retrieved on: Jul. 29, 2015, 8 pages.
Lafta, et al., "Securing DSSEC Last Mile with DTLS", In Master Thesis, May 18, 2015, 56 pages.
"Umbrella Roaming Client", Published on: Jun. 30, 2014, Available at: http://info.opendns.com/rs/opendns/images/TD-Roaming-Client-Deployment-Guide-for-Umbrella.pdf.
Jackson, William, "5 countries gain DNS Security Extensions", Published on: Oct. 13, 2010, Available at: http://fcw.com/articles/2010/10/13/dnssec-adds-five-country-domains.aspx.
Jeong, et al., "DNS Service for Mobile Ad Hoc Networks", Published on: Feb. 9, 2004, Available at: http://www.ietf.org/archive/id/draft-jeong-manet-dns-service-00.txt.
O'Brien, et al., "Securing Electronic Health Records on Mobile Devices", In NIST Special Publication 1800-1c, Jul. 2015, 91 pages.
"DNS Processes and Interactions", Published on: Mar. 16, 2011, Available at: https://technet.microsoft.com/en-us/library/dd197552(v=ws.10).aspx.
"DNS Best Practices, Network Protections, and Attack Identification", Published on: Oct. 25, 2008, Available at: http://www.cisco.com/web/about/security/intelligence/dns-bcp.html.
"DNSCrypt", Published on: Jan. 20, 2014, Available at: https://www.opendns.com/about/innovations/dnscrypt/.
Petullo, et al., "MinimaLT: Minimal-Latency Networking through Better Security", In Proceedings of 20th ACM Conference on Computer and Communications Security, Nov. 4, 2013, 13 pages.
Jang, et al., "A Time-Based Key Management Protocol for Wireless Sensor Networks", In Proceedings of Third International Conference on Information Security Practice and Experience, May 7, 2007, pp. 314-328.
Convery, et al., "SAFE: Wireless LAN Security in Depth", In White Paper, Jul. 4, 2004, pp. 1-48.
Bortzmeyer, S., "DNS privacy Considerations Draft-Ietf-Dprive-Problem-Statement-06", Published on: Jun. 15, 2015, Available at: https://datatracker.ietf.org/doc/draft-ietf-dprive-problem-statement/?include_text=1) and Pervasive Monitoring Is and Attack.
Farrell, et al., "Pervasive Monitoring is an Attack", Published on: May, 2014, Available at: http://tools.ietf.org/html/rfc7258.
Reddy, et al., "DNS over DTLS (DNSoD)", Retrieved on: Aug. 7, 2015, Available at: https://datatracker.ietf.org/doc/draft-wing-dprive-dnsodtls/?include_text=1 proposed.
Hu, et al., "TLS for DNS: Initiation and Performance Considerations draft-hzhwm-dprive-start-tls-for-dns-02", Published on: Apr. 15, 2015, Available at: https://tools.ietf.org/id/draft-hzhwm-dprive-start-tls-for-dns-02.txt.
"Second Written Opinion Issued in PCT Application No. PCT/US2016/052366", dated Aug. 3, 2017, 5 Pages.

\* cited by examiner

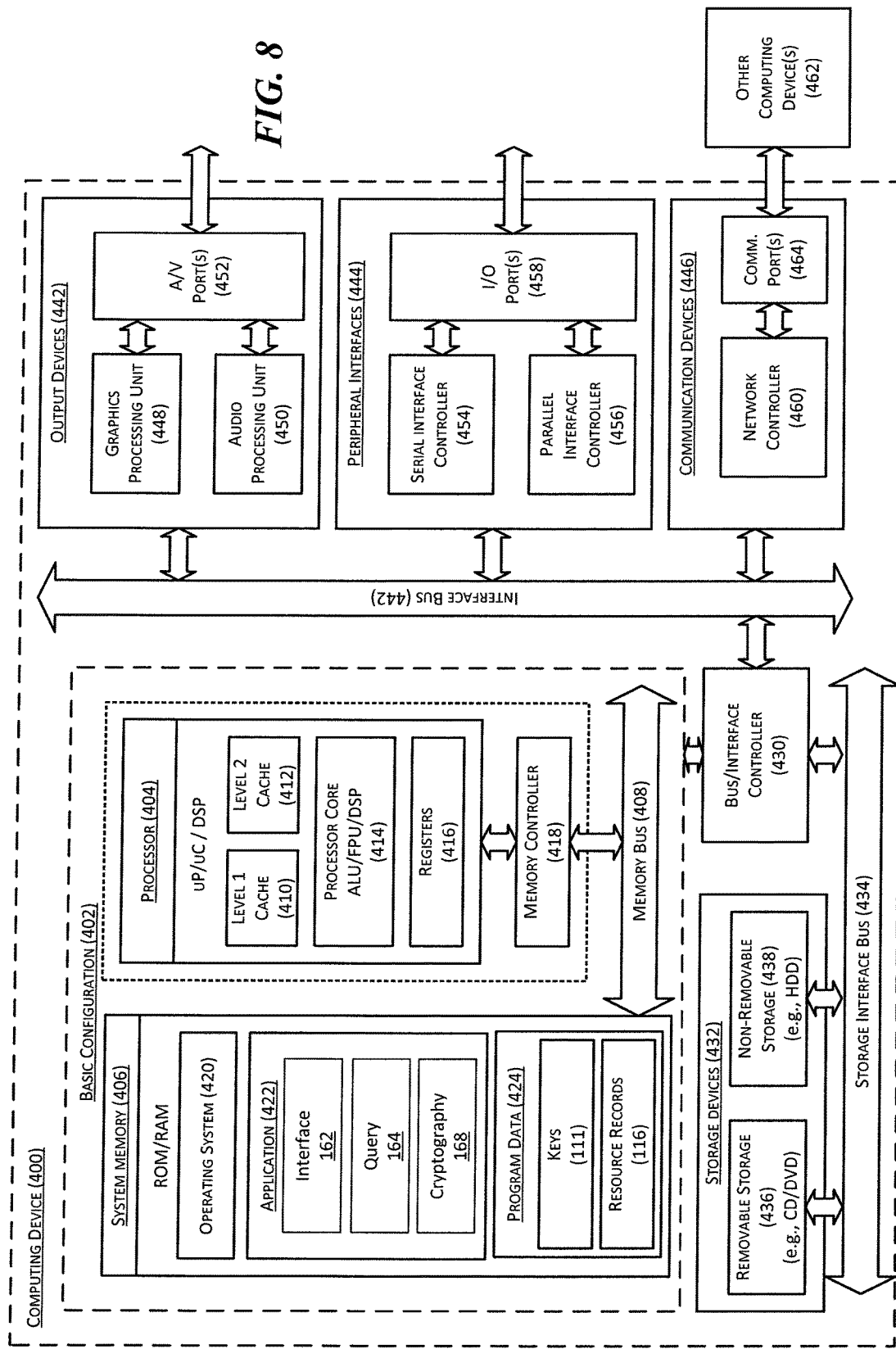

SECURE DOMAIN NAME RESOLUTION IN COMPUTER NETWORKS

BACKGROUND

In a computer network such as the Internet, users can identify web servers, email servers, or other resources by alphanumerical domain names. However, routers, switches, and other network services or devices identify such resources by numerical IP addresses. A domain name system facilitates operations of such computer networks by providing a translation service between an alphanumeric domain name and a corresponding numerical IP address. For example, a domain nameserver can translate domain name "www.example.com" to IP address "192.168.0.1." Routers, switches, or other computer services or devices can then access resources associated with the domain name based on the translated IP address.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A domain name system ("DNS") typically includes multiple authoritative servers and caching servers. The authoritative servers are configured to return specific domain name translations in response to DNS queries. Caching servers are configured to retrieve translations from authoritative servers and store or "cache" the retrieved translations for a period of time. To resolve a domain name (e.g., "www.example.com") from a client device, a caching server can determine if a corresponding translation is already cached. If one is available, the caching server can return the corresponding translation such as an IP address to the client device. If one is not available, the caching server can recursively query the authoritative servers to retrieve and return the requested IP address to the client device.

Unfortunately, the foregoing name resolution process is vulnerable for privacy violations and/or security attacks. For example, when a client device logs onto a WIFI network at a restaurant, hotel, coffee shop, hospital, airport, or WIFI hotspot, a DHCP server associated with the WIFI network can automatically assign a caching server to the client device. When a user enters domain names into, for example, a browser on the client device, the client device sends DNS queries to the assigned caching server for DNS records associated with the entered domain names.

However, the assigned caching server may not be dependable and/or trustworthy. For example, the assigned caching server can introduce network surveillance between the client device and authoritative servers by tracking requested DNS records. Thus, the caching server can violate the user's privacy by eavesdropping on the user's browsing history. In another example, the assigned caching server can provide incorrect DNS records to the client device to cause unintended connections, such as to phishing sites that impersonate legitimate websites.

Several embodiments of the disclosed technology can provide access to one or more trusted caching servers via an untrusted caching server associated with a WIFI network or other suitable types of local computer network. In example implementations, when a user enters a domain name into a browser on a client device, the client device encrypts a DNS query for resolving the entered domain name. The client device can then append a domain name of a trusted caching server (e.g., "trustedserver.com") to the encrypted DNS query to create a composite domain name. The client device can then generate and transmit a secured DNS query containing the composite domain name to the untrusted caching server.

Upon receiving the secured DNS query, the untrusted caching server can query one or more authoritative servers to resolve the composite domain name. The authoritative servers can be configured to provide the untrusted server with a resource record associated with a trusted caching server. The untrusted server can then forward the secured DNS query to the trusted caching server. Once received, the trusted caching server can extract and decrypt the encrypted DNS query. The trusted caching server can then provision a DNS response to the decrypted DNS query by, for example, performing recursive query of authoritative servers. Once provisioned, the trusted caching server can generate a secured DNS response by encrypting the provisioned DNS response. The trusted caching server can then transmit the secured DNS response to the untrusted caching server, which in turn forwards the secured DNS response to the client device. Upon reception, the client device can decrypt the secured DNS response and provide the decrypted DNS response to, for example, the browser on the client device for accessing intended network resources.

In certain example implementations, the foregoing encryption/decryption operations can utilize two sets of public and private cryptography keys associated with each of the client device and the trusted caching server. As such, secured DNS queries and the secured DNS responses can include electronic signatures based on the private keys of the client device and the trusted caching server. As used herein, an "electronic signature" generally refers to a stylized script associated with a person, device, system, or other suitable types of entity. Thus, the client device can validate the encrypted DNS responses to improve confidence that the received resource records are from a trusted source. In other example implementations, the foregoing encryption/decryption operations can also use symmetrical keys and/or other suitable types of cryptography keys and/or cryptography techniques.

Several embodiments of the disclosed technology can improve privacy and security of a DNS system by allowing a client device to access a trusted caching server via an untrusted caching server. For instance, in the example implementation above, the untrusted caching server may not eavesdrop on the user's browsing history because the actual user-requested domain names are encrypted in the DNS queries transmitted to the untrusted caching server. As such, the untrusted caching server may not identify the actual domain names requested by the user, and so cannot provide false IP addresses of unintended resources, such as phishing sites.

BRIEF DESCRIPTION OF THE DRAWINGS

FIG. 8 is a computing device suitable for certain components of the computing frameworks in FIG. 1.

DETAILED DESCRIPTION

Figure 1:
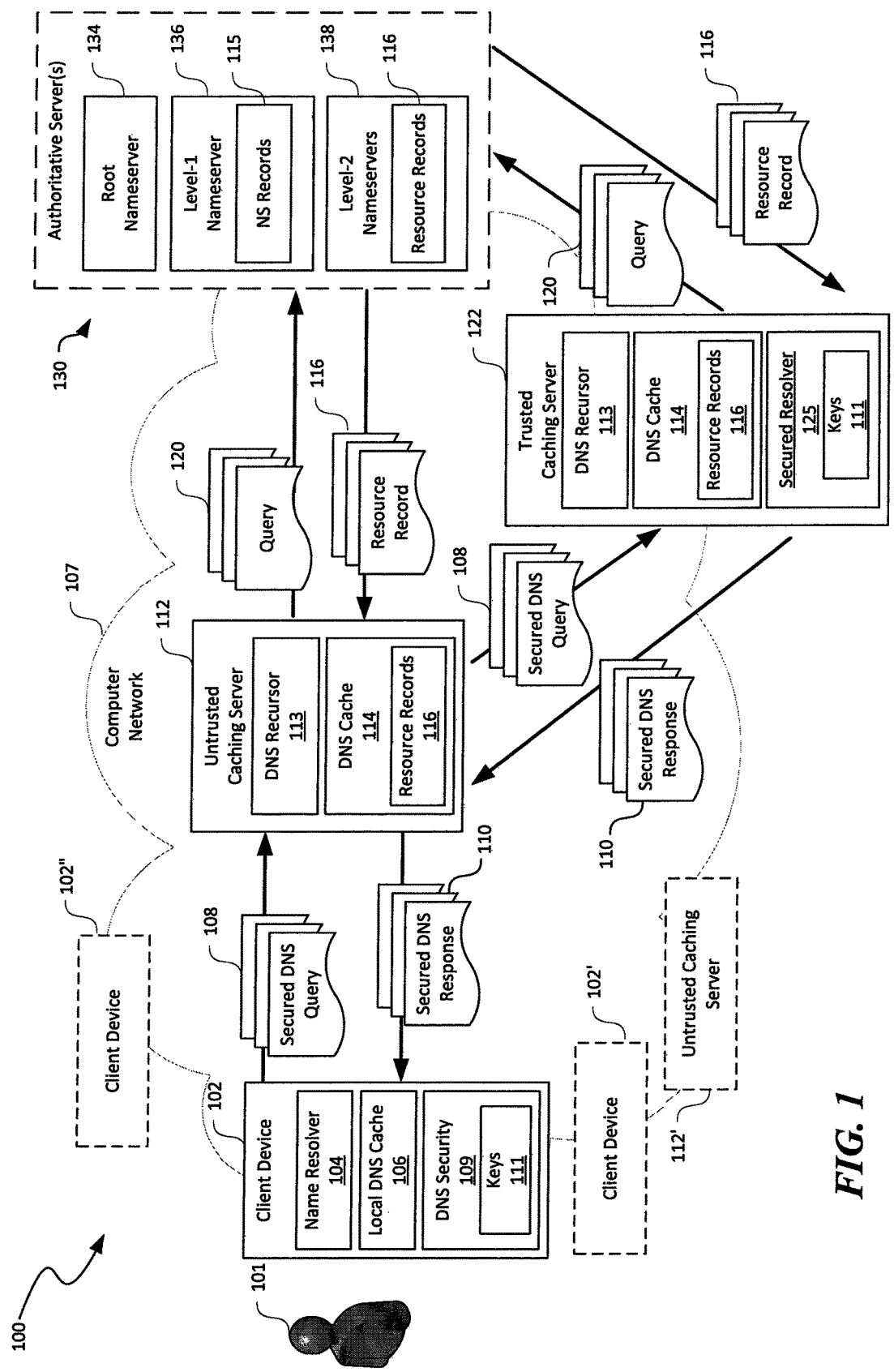
FIG. 1 is a schematic diagram illustrating computing frameworks having a trusted caching server in accordance with embodiments of the disclosed technology.

Certain embodiments of systems, devices, components, modules, routines, and processes for improving privacy and security of domain name systems are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-8.

As used herein, the term "domain name system" or "DNS" generally refers to a computer system configured to translate alphanumerical domain names into numerical IP addresses to effect communications in a computer network. In the following description, such translation can be referred to as "name resolution" or "resolving a domain name." A domain name system can include one or more operatively coupled DNS servers containing a database of domain name translations. Example DNS servers can include authoritative servers and caching servers organized into a hierarchy. One example DNS computing framework is described below with reference to FIG. 1.

An "authoritative server" generally refers to a DNS server configured to return authoritative domain name translations for particular domain names in response to DNS queries. For example, an authoritative server can contain a mapping of URLs of domain names to IP addresses defined by domain administrators or other authorized entities. In another example, an authoritative server can also contain a mapping of a host portion of email addresses (e.g., "@hotmail.com") to IP addresses. In a further example, an authoritative serer can also contain name server ("NS") records of other nameservers to which resolution authority is delegated. Authoritative servers for a domain or host may be configured by DNS hosting companies or network registrars, such as, for example, Amazon, GoDaddy, or Verisign.

A "caching server" generally refers to a DNS server configured to resolve a domain name of a target domain by, for example, recursively querying authoritative servers. For instance, each part of the URL "www.example.com" has a specific DNS server (or group of servers) that is authoritative. A root server can contain network addresses of authoritative servers for top-level domains such as ".com," ".net," or ".org." In one example resolution operation, a caching server can first query the root server for network addresses of authoritative servers for the ".com" domain. Then, the caching server queries the ".com" authoritative server for network addresses of authoritative servers for "example.com" domain. The caching server can then query the authoritative servers for the "example.com" domain for an IP address associated with the domain name "www.example.com."

Also used herein, the term a "DNS query" generally refers to an electronic data package representing a request from, e.g., a client device to a caching server or a caching server to an authoritative server for retrieving types of DNS records. For example, an A-type DNS query is a request for retrieving a 32-bit IPv4 address of a target domain name. An AAAA-type DNS query is a request for retrieving a 128-bit IPv6 address of a target domain name. A name server ("NS")-type query can be a request for retrieving an NS record that can include URLs of nameservers for a target domain name. An example data structure suitable for a DNS query is described in more detail below with reference to FIGS. 4A and 4B. The term a "DNS response" generally refers to an electronic data package representing answers to a DNS query. An example data structure suitable for a DNS response is described in more detail below with reference to FIG. 4C.

As used herein, a "trusted caching server" generally refers to a caching server that has verified security credentials in relation to a client device. Trusted caching servers may be public or private. For example, an organization (e.g., a company) may have one or more enterprise caching servers for users of the organization. In another example, a trusted entity (e.g., the Microsoft Corporation) can also provide one or more trusted caching servers to the general public on the Internet. In contrast, an "untrusted caching server" refers to a caching server without verified security credentials.

Automatically assigned caching servers at public locations may not be dependable and/or trustworthy. Accessing such caching servers can compromise users' privacy and/or security when accessing network resources. For example, the assigned caching servers can introduce network surveillance and/or provide incorrect resource records to the users. Several embodiments of the disclosed technology can improve privacy and/or security of a DNS system by providing access to one or more trusted caching servers via an untrusted caching server, as described in more detail below with reference to FIGS. 1-8.

FIG. 1 is a schematic diagram illustrating a DNS computing framework 100 having a trusted caching server in accordance with embodiments of the disclosed technology. As shown in FIG. 1, the computing framework 100 can include a client device 102, an untrusted caching server 112, a trusted caching server 122, and one or more authoritative servers 130 interconnected by a computer network 107. The computer network 107 can include the Internet, a local area network, a metropolitan area network, a wide area network, and/or other suitable types of network.

The client device 102, the untrusted caching server 112, the trusted caching server 122, and the authoritative servers 130 can each include a processor and memory (not shown) containing instructions for execution by the processor to provide certain software components discussed in more detail below. Even though particular components of the computing framework 100 are shown in FIG. 1, in other embodiments, the computing framework 100 can also include additional and/or different components. For example, as shown in FIG. 1, the computing framework 100 can include an additional caching server 112', additional client devices 102' and 102", and/or other suitable components.

The client device 102 can include a desktop, a laptop, a tablet, a smartphone, and/or other suitable types of computing device. For example, the client device 102 can be an iPhone or iPad provided by Apple, Inc. of Cupertino, Calif., an Android device, a Chromebook device, a Windows device, or any other suitable devices. In the illustrated embodiment of FIG. 1, the client device 102 can include a name resolver 104, a local DNS cache 106, and a DNS security component 109 with one or more cryptography keys 111. In other embodiments, the client device 102 may also include other suitable hardware and/or software components.

The name resolver 104 can be configured to determine network addresses (e.g., IP addresses) associated with domain names (e.g., "www.example.com"), email addresses (e.g., example@example.com), or other network resources. The name resolver 104 may be a part of an operating system or an application executing on the client device 102. The local DNS cache 106 can be configured to store resource records of previously resolved domain names. The name resolver 104 can determine an IP address by accessing a resource record 116 stored in the local DNS cache 106. When a resource record 116 does not exist in the local DNS cache 106, the name resolver 104 can query the untrusted caching server 112 for the desired resource record 116. For example, the name resolver 104 can transmit a secured DNS query 108 to and receive a secured DNS response 110 from the untrusted caching server 112.

The DNS security component 109 can be configured to facilitate generating the secured DNS query 108 and processing the secured DNS responses 110. In certain embodiments, the DNS security component 109 can be configured to encrypt a DNS query for a domain name entered by the user 101 and to decrypt the secured DNS response 110 to obtain a resource record 116 or other suitable types of replies using the cryptography keys 111. In other embodiments, the DNS security component 109 can also be configured to generate and attach an electronic signature to the secured DNS query 108 and/or validate the secured DNS response 110 by inspecting an attached electronic signature. Components and associated operations of the DNS security component 109 are described in more detail below with reference to FIGS. 2A-2B.

The cryptography keys 111 can each include a variable value that is applicable to a string or block of unencrypted text to produce encrypted text, or to decrypt encrypted text according to an cryptography algorithm. The cryptography keys 111 can also be used for digital signature schemes, message authentication codes, or other suitable cryptography operations. The cryptography keys 111 can include a variety of types of keys. For example, the cryptography keys 111 can include private signature keys, public signature verification keys, symmetric authentication keys, private authentication keys, public authentication keys, symmetric data encryption keys, symmetric key wrapping keys, symmetric master keys, private key transport keys, public key transport keys, symmetric key agreement keys, private static key agreement keys, public static key agreement keys, private ephemeral key agreement keys, public ephemeral key agreement keys, symmetric authorization keys, private authorization keys, public authorization keys, or other suitable types of cryptography keys.

The authoritative servers 130 can include a plurality of DNS servers arranged in a hierarchy. For example, as shown in FIG. 1, the authoritative servers 130 can include a root nameserver 134, a level-1 nameserver 136 subordinate to the root nameserver 134, and a level-2 nameservers 138 subordinate to the level-1 nameserver 136. Even though a three-level hierarchy of DNS servers 130 is shown in FIG. 1, in other embodiments, the authoritative servers 130 can include one, two, four, or any other suitable number of levels and/or servers. For example, the authoritative servers 130 can also include a level-3 nameserver (not shown) subordinate to the level-2 nameserver 138.

As shown in FIG. 1, in the hierarchy of the authoritative servers 130, the root nameserver 134 can contain a resource record (not shown) containing a network address for the level-1 nameserver 136 corresponding to, e.g., a top-level domain such as ".com". The level-1 nameserver 136 can include a NS record 115 containing URLs for the level-2 nameservers 138 corresponding to a domain name, e.g., "example.com." The level-2 nameservers 138 can then include a resource record 116 containing an IP address (e.g., 192.168.0.1) that corresponds to a server associated with the domain name "www.example.com."

Also shown in FIG. 1, the untrusted caching server 112 can include a DNS recursor 113 operatively coupled to a DNS cache 114. The DNS recursor 113 can be configured to recursively resolve a domain name of a target domain by transmitting one or more queries 120 to and receiving NS record 115 or resource record 116 from the one or more authoritative servers 130. The DNS cache 114 can be configured to store any resource records 116 previously resolved by the DNS recursor 113 for a period of time, for example, as specified by a time-to-live value. In certain embodiments, a value of the time-to-live period can be set by one or more of the authoritative servers 130. In other embodiments, the time-to-live value may be set by an administrator, an application, or other suitable entities.

The trusted caching server 122 can include certain components generally similar to those of the untrusted caching server 112. As such similar components are identified by similar references. For example, the trusted caching server 122 can include a DNS recursor 113 and a DNS cache 114 containing previously retrieved resource records 116. As shown in FIG. 1, the trusted caching server 122 can also include a secured resolver 125 having another set of cryptography keys 111. The secured resolver 125 can be configured to extract an encrypted DNS query from the secured DNS query 108 and decrypt the extracted DNS query using the cryptography keys 111. The secured resolver 125 can then provision a DNS response by either retrieving a resource record 116 in the DNS cache 114 or invoking the DNS recursor 113 to retrieve a resource record 116 from the authoritative servers 130. The secured resolver 125 can also be configured to encrypt a DNS response to the decrypted DNS query to generate a secured DNS response 110 to be forwarded to the untrusted caching server 112. Components and associated operations of the secured resolver 125 are described in more detail below with reference to FIG. 3.

In operation, the user 101 can request access to a domain name (e.g., "www.example.com") using the client device 102. The name resolver 104 at the client device 102 can first determine if a resource record 116 for the requested domain name already exists or cached in the local DNS cache 106. If one already exists, the client device 102 can initiate network operations to servers associated with the domain name based on the cached resource record 116. If one does not exist, the client device 102 can invoke the DNS security component 109 to generate a secured DNS query 108 to be transmitted to the untrusted caching server 112 for a corresponding resource record 116.

Once invoked, the DNS security component 109 can encrypt a DNS query containing the entered domain name using one of the cryptography keys 111. For instance, a DNS query for the domain name "www.example.com" may be encrypted into a string containing a number of random characters such as "mJhPDnK5lw." The DNS security component 109 can then append at least a partial domain name or other suitable network resource identifiers to the encrypted string. For example, the DNS security component 109 can append "trustedserver.com" to the encrypted string to generate a composite domain name as follows:

mJhPDnK5lw.trustedserver.com

The DNS security component 109 can then provide the generated composite domain name to the name resolver 104, which in turn generates a secured DNS query 108 for the composite domain name. The name resolver 104 can then transmit the secured DNS query 108 to the untrusted caching server 112 for resolving the composite domain name, e.g., "mJhPDnK5lw.trustedserver.com."

In response to the received secured DNS query 108, the untrusted caching server 112 can first determine if a resource record 116 is available in the DNS cache 114 for the composite domain name. If one is available, the caching server 112 can return the resource record 116 as a DNS response 110. However, because the composite domain name is recently generated at the client device 102, the untrusted caching server 112 would not likely contain a corresponding resource record 116. As such, the untrusted caching server 112 can invoke the DNS recursor 113 to recursively query the authoritative servers 130 for resolving the composite domain name. For example, the caching server 112 can first query the root nameserver 134 for a resource record containing a network address of the level-1 nameserver 136 (e.g., 198.41.0.4). Then, the caching server 112 can query the level-1 nameserver 136 for a NS record 115 containing a network address of the level-2 nameserver 138.

In certain embodiments, the authoritative servers 130 can be configured to provide a resource record 116 that identifies the trusted caching server 122 based on, for example, the appended domain name (e.g., "trustedserver.com"). For example, any domain names having the appended domain name can be associated with resource records 116 in, for instance, the level-2 nameserver 138 that each contains an IP address of the trusted caching server 122. In other embodiments, any domain names having the appended domain name can be associated with a single resource record 116 by, for instance, treating the encrypted string (e.g., "mJhPDnK5lw") as a wild card.

As such, when the untrusted caching server 112 queries for a resource record 116 corresponding to the composite domain name, the level-2 nameserver 138 can provide a network address of the trusted caching server 122 (e.g., 192.168.0.1) to the untrusted caching server 112. The untrusted caching server 112 can then forward the secured DNS query 108 to the trusted caching server 122 based on the network address obtained from the level-2 nameserver 138.

Upon reception, the secured resolver 125 of the trusted caching server 122 can extract the encrypted string from the composite domain name. In the example above, the secured resolver 125 extracts "mJhPDnK5lw" from the composite domain name "mJhPDnK5lw.trustedserver.com." The secured resolver 125 can then decrypt the encrypted string using one of the cryptography keys 111 to obtain a decrypted DNS query for the domain name (e.g., "www.example.com") entered by the user 101.

The trusted caching server 122 can then generate a DNS response based on the decrypted DNS query by retrieving a resource record 116 in the DNS cache 114 or invoking the DNS recursor 113 to retrieve a copy of the resource record 116 from the authoritative servers 130. The secured resolver 125 can then encrypt the generated DNS response using one of the cryptography keys 111 to generate a secured DNS response 110. In one embodiment, the entire DNS response can be encrypted. As such, the secured DNS response 110 can contain an encrypted string. In other embodiments, at least the resource record 116 (e.g., an IP address corresponding to "www.example.com") is encrypted in the secured DNS response 110.

The trusted caching server 122 can then forward the secured DNS response 110 to the untrusted caching server 112 as a response to the secured DNS query 108. The untrusted caching server 112 in turn can forward the received secured DNS query 108 to the client device 102. Upon reception, the DNS security component 109 of the client device 102 can decrypt the secured DNS response 110 to obtain the resource record 116 in a decrypted form. The client device 102 can then access network resources on the computer network 107 based on the obtained resource record 116.

In certain embodiments, the client device 102 and the trusted caching server 122 can utilize a symmetrical encryption key. As such, the client device 102 and the trusted caching server 122 can contain the same key 111 and can utilize the key 111 to encrypt, decrypt, and authenticate the secured DNS query 108 and the secured DNS response 110. In other embodiments, the client device 102 and the trusted caching server 122 can utilize a public key and a private key at both devices. For example, the client device 102 can contain a private key associated with the client device 102 and a public key associated with the trusted caching server 122. The trusted caching server 122 can contain a private key associated with the trusted caching server 122 and a public key of the client device 102. In operation, the client device 102 can encrypt the user-requested domain name using the public key associated with the trusted caching server 122 and attached an electronic signature generated using the private key associated with the client device. The trusted caching server 122 can then authenticate the electronic signature using the public key associated with the client device 102 and decrypt the user-requested domain name using the private key associated with the trusted caching server 122.

The trusted caching server 122 can then encrypt the DNS response using the public key of the client device 102 and attach another electronic signature generated using the private key associated with the trusted caching server 122. Once the client device 102 receives the secured DNS response 110, the client device 102 can validate the electronic signature using the public key associated with the trusted caching server 122 and decrypt the encrypted DNS response using the private key of the client device 102. By validating the electronic signature, the client device 102 can have confidence that the received secured DNS response 110 is indeed from the trusted caching server 122. Thus the risk of being connected to unintended network resources can be lower than conventional techniques. In certain embodiments, results of such validation can be represented on a user interface on the client device 102. Examples of such user interface are described in more detail below with reference to FIGS. 5A and 5B. In other embodiments, results of such validation can be represented as a popup display, a balloon, or other suitable messages.

In any of the foregoing embodiments, the client device 102 and the trusted caching server 122 can be configured to implement any suitable cipher algorithms. Example cipher algorithms can include, without limitation, Rivest Cipher 4, Tiny Encryption Algorithm ("TEA"), Extended TEA, Corrected Block TEA, and Treyfer.

Several embodiments of the disclosed technology can improve privacy and security of a DNS system by allowing the client device 102 to access the trusted caching server 122 via the untrusted caching server 112. The untrusted caching server 112 cannot eavesdrop on the browsing history of the user 101 because the actual user-requested domain names are encrypted in the secured DNS query 108 transmitted to the untrusted caching server 112. As such, the untrusted caching server 112 may not identify the actual domain names requested by the user 101, or provide false IP addresses of unintended resources, such as phishing sites.

Even though the disclosed technology is discussed above in the context of name resolution in a DNS system, in other embodiments, aspects of the disclosed technology can also be used to obtain other suitable types of information. For instance, the example encrypted string "mJhPDnK5lw" contained in the secured DNS query 108 can also be a request for a schedule, a phone number, an email address, a weather forecast, or other suitable information instead of an IP address associated with a domain name. In response to receiving the encrypted string, the trusted caching server 122 can provision a reply to the request and encrypt the reply before transmitting to the untrusted caching server 112, which in turn forwards the encrypted reply to the client device 102. Through similar operations as discussed above, the client device 102 can then obtain the requested information by decrypting the encrypted reply with the cryptography keys 111.

Figure 2A:
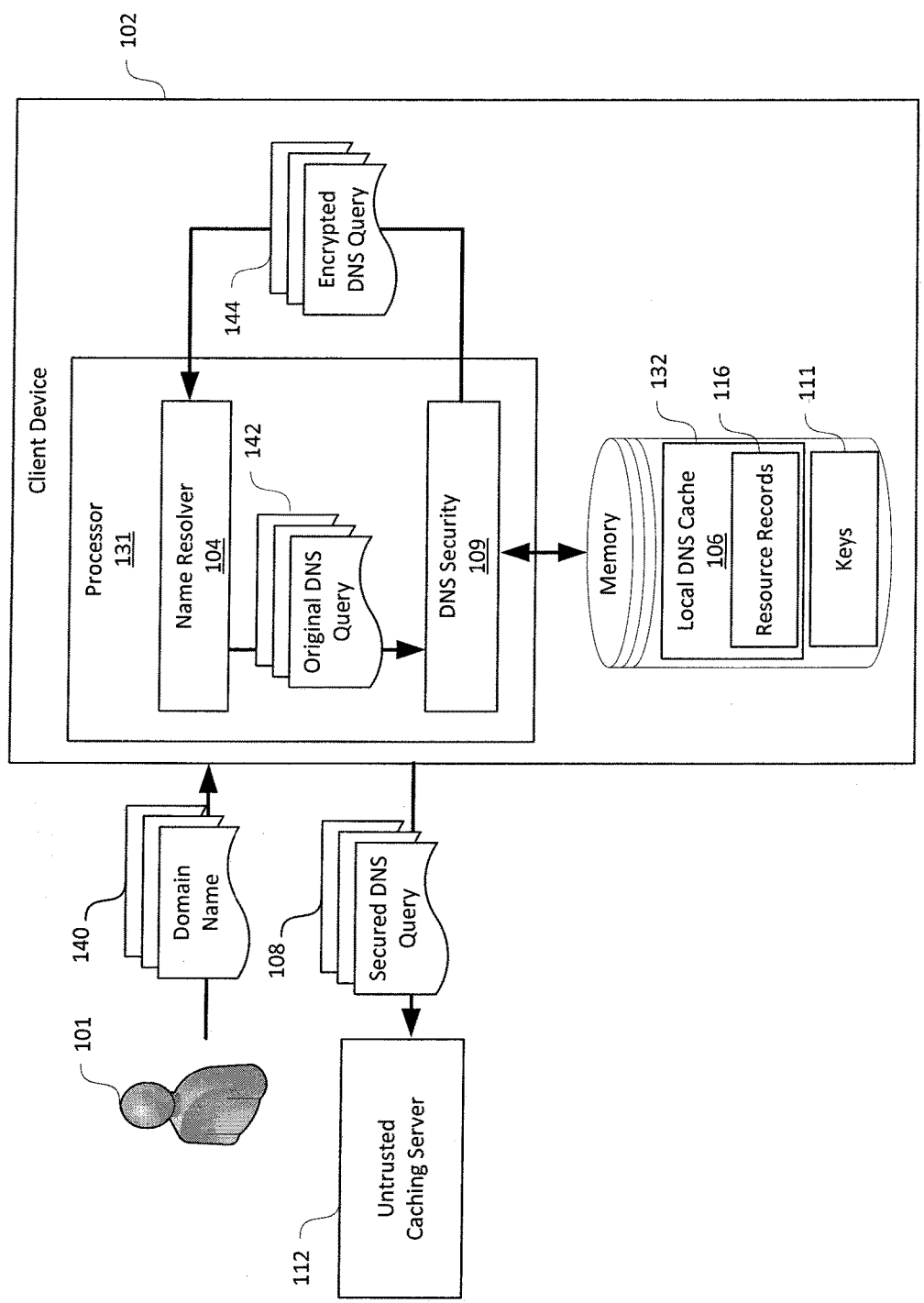
FIGS. 2A and 2B are block diagrams showing software components suitable for the client device of FIG. 1 for processing a DNS query and a DNS response, respectively, in accordance with embodiments of the disclosed technology.
Figure 2B:
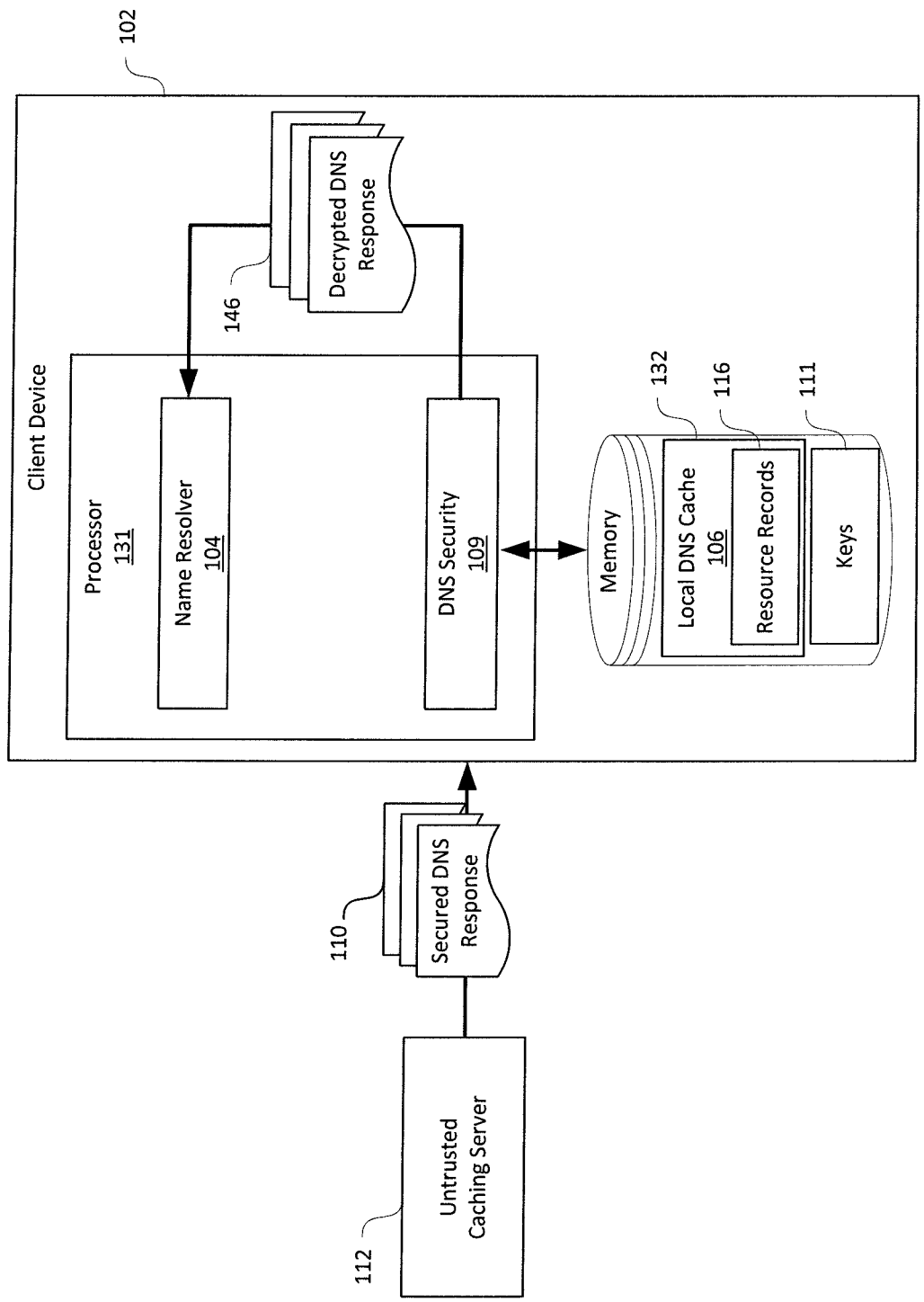

FIGS. 2A and 2B are block diagrams showing software components suitable for the client device 102 of FIG. 1 for processing a DNS query and a DNS response, respectively, in accordance with embodiments of the disclosed technology. In particular, FIG. 2A illustrates operations related to generating a secured DNS query 108. FIG. 2B illustrates operations related to processing a secured DNS response 110. Certain components of the computing framework 100 of FIG. 1 are omitted in FIGS. 2A and 2B for clarity.

In FIGS. 2A and 2B and in other Figures hereinafter, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). Components within a system may take different forms within the system. As one example, a system comprising a first component, a second component and a third component can, without limitation, encompass a system that has the first component being a property in source code, the second component being a binary compiled library, and the third component being a thread created at runtime.

The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware can be considered fossilized software, and software can be considered liquefied hardware. As just one example, software instructions in a component can be burned to a Programmable Logic Array circuit, or can be designed as a hardware circuit with appropriate integrated circuits. Equally, hardware can be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the client device 102 can include a processor 131 coupled to a memory 132. The processor 131 can include a microprocessor, a field-programmable gate array, and/or other suitable logic devices. The memory 132 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 131 (e.g., instructions for performing the methods discussed below with reference to FIGS. 5A-5B). As shown in FIG. 2A, the memory 132 can also contain the local DNS cache 106 containing resource records 116 (FIG. 1), the cryptography keys 111, and/or other suitable data.

The processor 131 can execute instructions to provide a plurality of software components configured to provide secured DNS name resolution. As shown in FIG. 2A, the software components can include a name resolver 104 operatively coupled to a DNS security component 109. In one embodiment, all of the software components can reside on a single computing device (e.g., a DNS server). In other embodiments, the software components 141 can also reside on a plurality of distinct computing devices. In further embodiments, the software components may also include network interface components and/or other suitable components (not shown).

As shown in FIG. 2A, the name resolver 104 can be configured to receive a domain name 140 (e.g., "www.example.com") from the user 101 and resolve the received domain name 140 in cooperation with the DNS security component 109. Upon receiving the domain name 140, the name resolver 104 can be configured to determine if a corresponding resource record 116 is already present in the local DNS cache 106. If one is already present, the name resolver 104 returns the corresponding resource record 116. If one is not present, the name resolver 104 can be configured to generate an original DNS query 142 for resolving the domain name 140. The name resolver 104 can then be configured to forward the original DNS query 142 to the DNS security 109 for further processing.

Upon receiving the original DNS query 142, the DNS security component 109 can be configured to encrypt the original DNS query 142 utilizing one or more of the cryptography keys 111 from the memory 132 to generate an encrypted DNS query 144. The encrypted DNS query 144 can include a string (e.g., "mJhPDnK5lw") or other suitable types of data. In certain embodiments, the DNS security component 109 can also be configured to attach an electronic signature to the encrypted DNS query 144, for instance, by using a private key associated with the user 101 or the client device 102. The DNS security component 109 can then be configured to return the encrypted DNS query 144 to the name resolver 104.

The name resolver 104 can append at least a partial domain name associated with the trusted caching server 122 (FIG. 1) to the encrypted DNS query 144 to generate a composite domain name. As such, the composite domain name includes at least a first part containing the encrypted DNS query 144 and a second part containing the at least partial domain name associated with the trusted caching server 122. The name resolver 104 can then be configured to generate a secured DNS query 108 for resolving the composite domain name and transmit the secured DNS query 108 to the untrusted caching server 112.

In operation, the name resolver 104 can receive the domain name 140 from the user 101. If a corresponding resource record 116 is not already present in the local DNS cache 106, the name resolver 104 can generate and transmit the original DNS query 142 for resolving the domain name 140 to the DNS security component 109. The DNS security component 109 can then encrypt the original DNS query 142 and electronically sign the encrypted DNS query 144 using one or more cryptography keys 111 in the memory 132. The name resolver 104 can then generate a composite domain name (e.g., "mJhPDnK5lw.trustedserver.com") by appending at least a partial domain name associated with the trusted caching server 122 to the received encrypted DNS query 144. The name resolver 104 can then generate and transmit the secured DNS query 108 for resolving the composite domain name to the untrusted caching server 112.

As shown in FIG. 2B, the DNS security component 109 can also be configured to decrypt the secured DNS response 110 received from the untrusted caching server 112 to generate a decrypted DNS response 146 utilizing one or more cryptography keys 111 from the memory 132. In certain embodiments, the decrypted DNS response 146 can include a resource record 116 (FIG. 1) corresponding to the domain name 140 (FIG. 2A). In other embodiments, the decrypted DNS response 110 can also include schedules, phone numbers, email addresses, weather forecasts, and/or other suitable information. The DNS security component 109 can then be configured to provide the decrypted DNS response 146 to the name resolver 104 or other suitable components of the client device 102.

Even though the name resolver 104 and the DNS security component 109 are shown as separate components in FIGS. 2A and 2B, in certain embodiments, the DNS security component 109 can be a part of the name resolver 104. In other embodiments, instead of encrypting the original DNS query 142 at the DNS security component 109, the DNS security component 109 can also be configured to encrypt only the domain name 140 included in the original DNS query 142. In further embodiments, the DNS security component 109 can be configured to also encrypt other suitable information included in the original DSN query 142.

Figure 3:
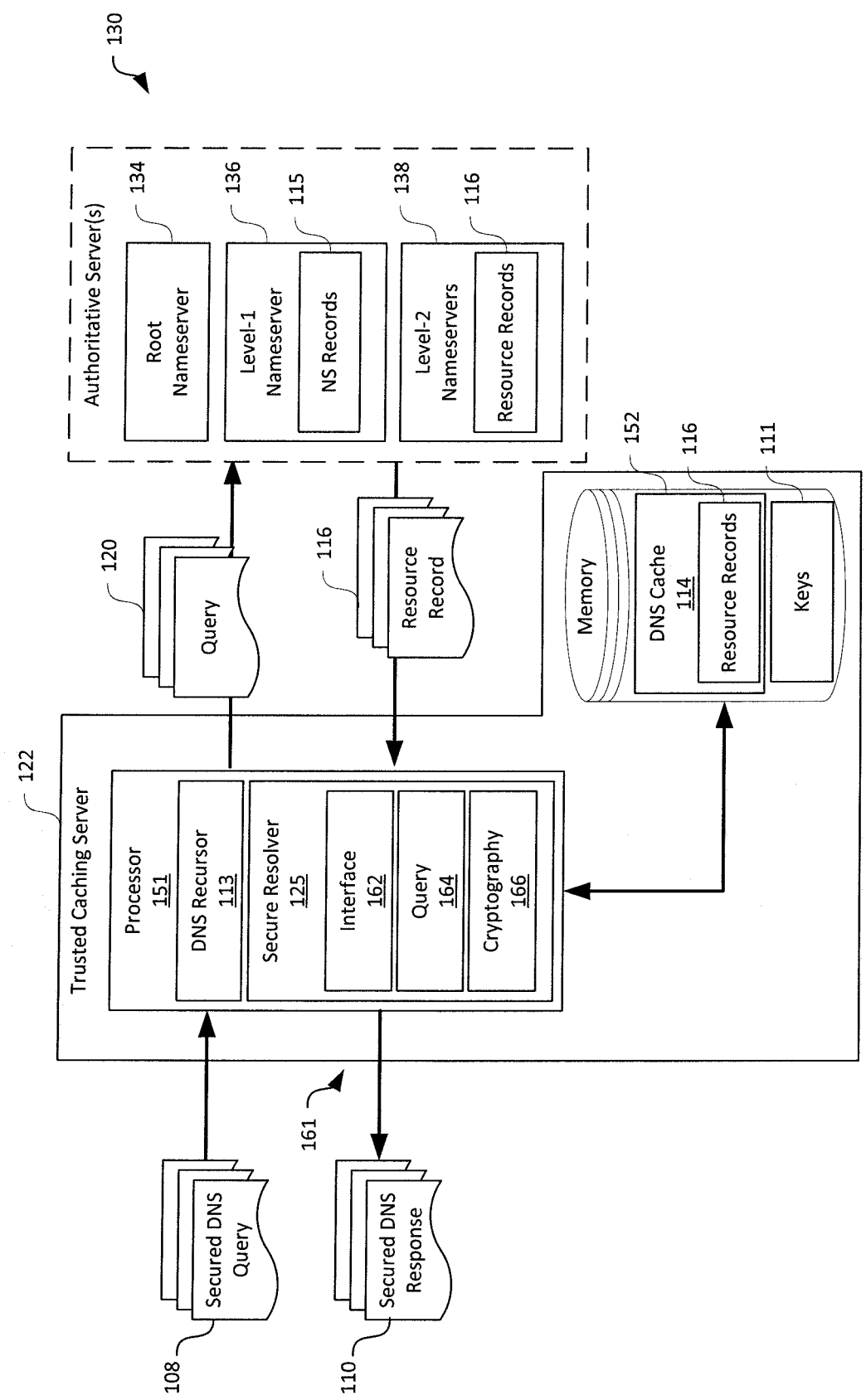
FIG. 3 is a block diagram showing software components suitable for the trusted caching server of FIG. 1 in accordance with embodiments of the disclosed technology.

FIG. 3 is a block diagram showing software components suitable for the trusted caching server 122 of FIG. 1 in accordance with embodiments of the disclosed technology. As shown in FIG. 3, the trusted caching server 122 can include a processor 151 coupled to a memory 152. The processor 151 can include a microprocessor, a field-programmable gate array, and/or other suitable logic devices. The memory 152 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 151 (e.g., instructions for performing the methods discussed below with reference to FIGS. 6A-6E). As shown in FIG. 3, the memory 152 can also contain data representing cryptography keys 111, resource records 116, and/or other suitable data.

The processor 151 can execute instructions to provide the DNS recursor 113 and a plurality of software components 161 of the secure resolver 115. As shown in FIG. 3, the software components 161 can include an interface component 162, a query component 164, and a cryptography component 166 operatively coupled to one another. In one embodiment, all of the software components 161 can reside on a single computing device (e.g., a DNS server). In other embodiments, the software components 161 can also reside on a plurality of distinct computing devices. In further embodiments, the software components 161 may also include network interface components and/or other suitable modules or components (not shown).

As shown in FIG. 3, the interface component 162 can be configured to receive a secured DNS query 108, from, for example, the untrusted caching server 112 of FIG. 1. The interface component 162 can also be configured to provide a secured DNS response 110 to the untrusted caching server 112 in response to the received secured DNS query 108. In certain embodiments, the interface component 162 can include a network interface module with suitable firmware or software to perform the foregoing operations. In other embodiments, the interface component 162 can include other suitable types of communications modules.

The cryptography component 166 can be configured to extract the encrypted DNS query 144 (FIG. 2A) from the received secured DNS query 108. For example, in certain embodiments, the encrypted DNS query 144 can be extracted by separating the first part of the composite domain name from the second part. In other examples, the encrypted DNS query 144 can be extracted based on a number of characters, character patterns, and/or other suitable criteria.

The cryptography component 166 can be configured to decrypt the encrypted DNS query 144 using one or more of the cryptography keys 111 in the memory 152. The cryptography component 166 can decrypt the encrypted DNS query 144 to obtain the original DNS query 142 (FIG. 2A) using a symmetrical encryption key shared with the client device 102 (FIG. 1), a private key associated with the trusted caching server 122, and/or other suitable decryption techniques. The cryptography component 166 can then provide the original DNS query 142 to the query component 164.

The query component 144 can be configured to provision a resource record 116 based on the original DNS query 142 received from the cryptography component 166. In one embodiment, the query component 164 can retrieve a cached resource record 116 in the memory 152 and construct a DNS response based thereon. If a cached resource record 116 does not exist in the memory 152, the query component 164 can be configured to invoke the DNS recursor 113 to transmit one or more queries 120 to the authoritative name servers 130 for retrieving a resource record 116 corresponding to the domain name 140 (FIG. 2A) in the original DNS query 142.

In certain embodiments, the cryptography component 166 can be configured to encrypt the resource record 116 retrieved from the memory 152 or from the authoritative servers 130 using a symmetrical key, a public key of the client device 102, and/or other suitable cryptography keys 111. The query component 164 can then be configured to generate the secured DNS response 110 containing the encrypted resource record 116, and forward the secured DNS response 110 to the untrusted caching server 112 via the interface component 162. In other embodiments, the query component 164 can generate a DNS response based on the retrieved resource record 116. The cryptography component 166 can then be configured to encrypt the generated DNS response to derive an encrypted DNS response as at least a part of the secured DNS response 110.

Figure 4A:
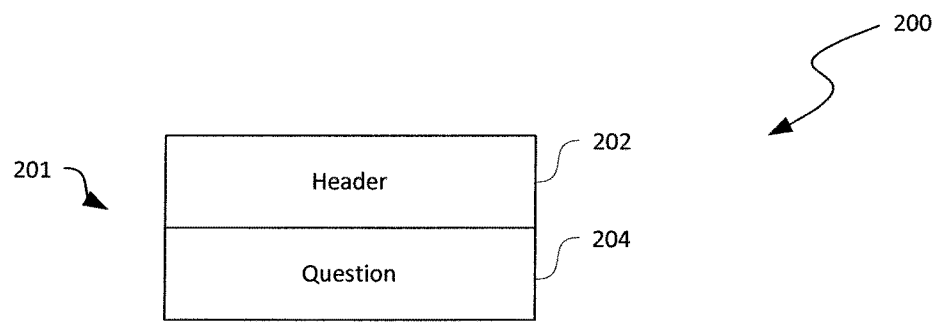
FIG. 4A is a schematic diagram illustration an example data structure suitable for the DNS query of FIG. 2A in accordance with embodiments of the disclosed technology.

FIG. 4A is a schematic diagram illustrating an example data structure 200 suitable for the queries 120, DNS query 142 of FIG. 2A, or the secured DNS query 108 of FIG. 1 in accordance with embodiments of the disclosed technology. As shown in FIG. 4A, the data structure 200 can include a header field 202 and a question field 204. The header field 202 can include parameters that describe the type of query and which fields are contained in the query. For example, the header field 202 can contain a query identifier, a one-bit field that specifies whether the data structure 200 is a query or a response, or other suitable parameters.

Figure 4B:
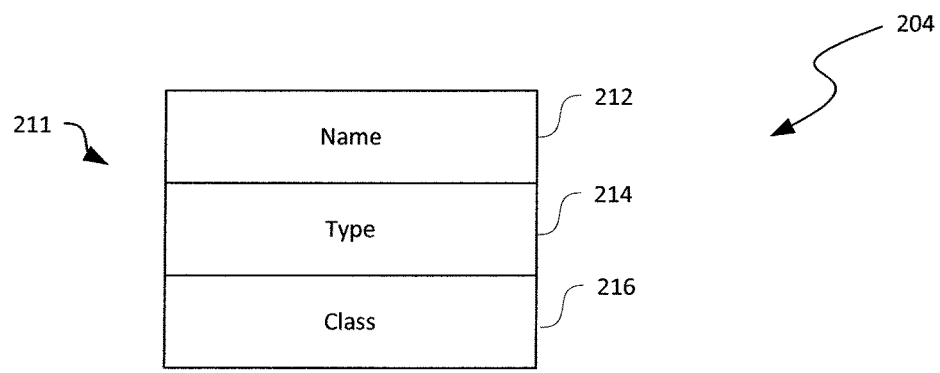
FIG. 4B is a schematic diagram illustration an example data structure suitable for the question field of FIG. 4A in accordance with embodiments of the disclosed technology.

The question field 204 can contain a question for a DNS server (e.g., the untrusted caching server 112 of FIG. 1). FIG. 4B is a schematic diagram illustration an example data structure suitable for the question field 204 of FIG. 4A in accordance with embodiments of the disclosed technology. As shown in FIG. 4B, the question field 204 can include a name field 212, a type field 214, and a class field 216. The name field 212 can contain a domain name represented as a sequence of labels. In the example discussed with reference to FIG. 1, the name field 212 can include the composite domain name, i.e., "mJhPDnK5lw.trustedserver.com." The type field 214 can contain data specifying a query type, for example, data indicating an A-type query. The class field 216 can contain data specifying the class of the query (e.g., "IN" indicating Internet). In other embodiments, the question field 204 can also include other suitable fields.

Figure 4C:
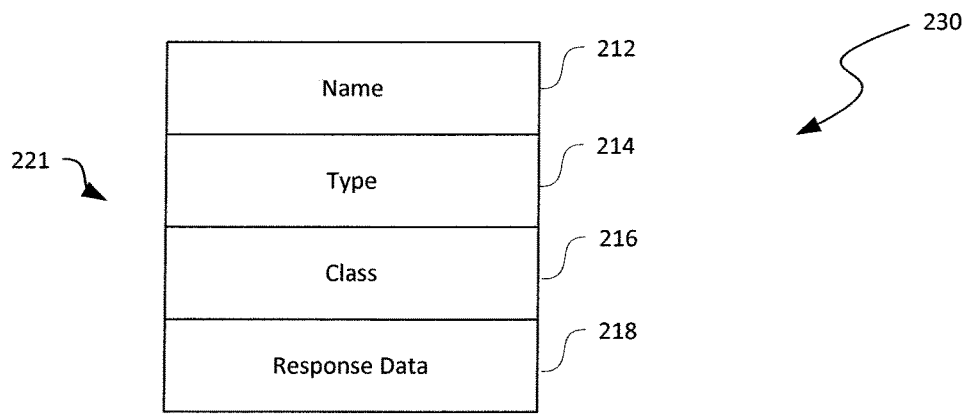
FIG. 4C is a schematic diagram illustration an example data structure suitable for the DNS response of FIG. 2B in accordance with embodiments of the disclosed technology.

FIG. 4C is a schematic diagram illustration an example data structure 230 suitable for the resource record 116 of FIGS. 1-3 in accordance with embodiments of the disclosed technology. As shown in FIG. 4C, the data structure 230 can include certain fields generally similar to that of FIG. 4B. For example, the data structure 230 can include a name field 212, a type field 214, and a class field 216. The data structure 230 can also include a response data field 218 containing, for example, an IP address or an URL of the trusted caching server 122 of FIGS. 1 and 3. In other example, the response data field 218 can also contain an encrypted response from the trusted caching server 122. In other embodiments, the data structure 230 can also include a time-to-live field, a length of response data field, or other suitable fields.

Figure 5A:
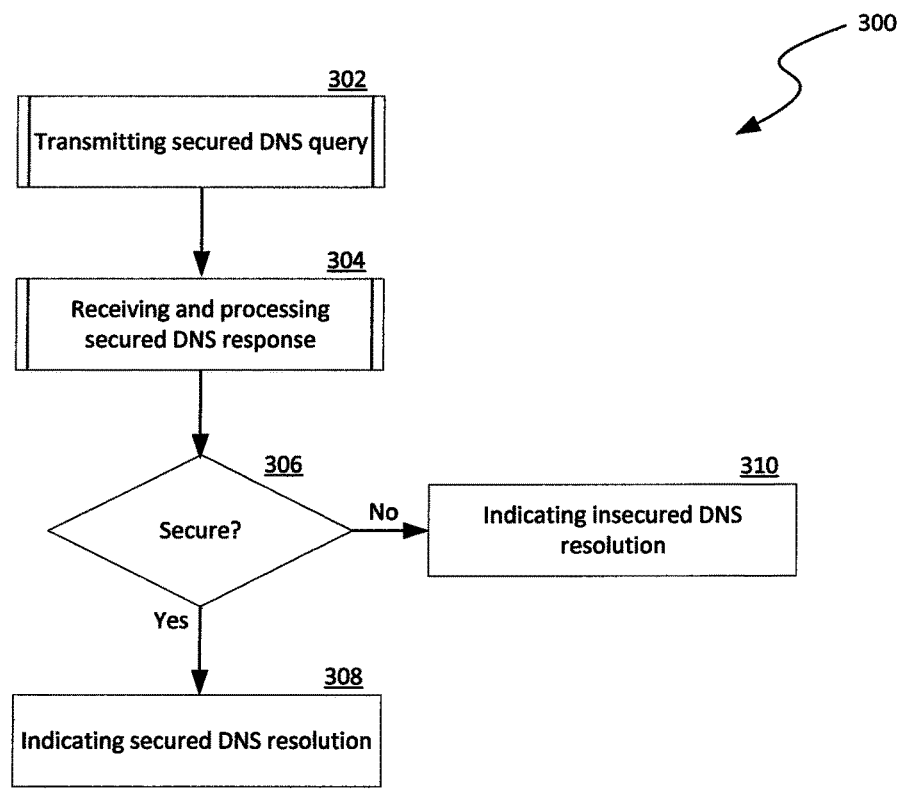
FIGS. 5A-5C are flow diagrams illustrating embodiments of a process of secured name resolution at a client device in accordance with embodiments of the disclosed technology.

FIG. 5A is a flow diagram illustrating embodiments of a process 300 of secured name resolution at a client device in accordance with embodiments of the disclosed technology. Even though various embodiments of the process 300 are described below with reference to the computing framework 100 of FIG. 1 and the software components of FIGS. 2A and 2B, in other embodiments, the process 300 may be performed with other suitable types of computing frameworks, systems, components, or modules.

As shown in FIG. 5A, the process 300 can include generating and transmitting a secured DNS query to a caching server (e.g., the untrusted caching server 112 of FIG. 1) at stage 302. The secured DNS query contains a composite domain name that includes a first part having an encrypted request and a second part having an unencrypted network resource identifier (e.g., a domain name). Examples of generating the secured DNS request are described in more detail below with reference to FIG. 5B.

The process 300 can then include receiving and processing a secured DNS response received from the caching server at stage 304. The received secured DNS response contains an encrypted reply to the encrypted request in the first part of the composite domain name associated with the secured DNS query. Examples of processing the secured DNS response are described in more detail below with reference to FIG. 5B.

The process 30 can also include an optional decision stage 306 to determine if the received DNS response is secure, for example, from a trusted source. In response to determining that the received DNS response is secure, the process 300 can include indicating secured DNS resolution at stage 308, for example, on the user interface 401 in FIG. 7A. In response to determining that the received DNS response is not secure, the process 300 can include indicating insecure DNS resolution at stage 310, for example, on the user interface 401 in FIG. 7B.

Figure 5B:
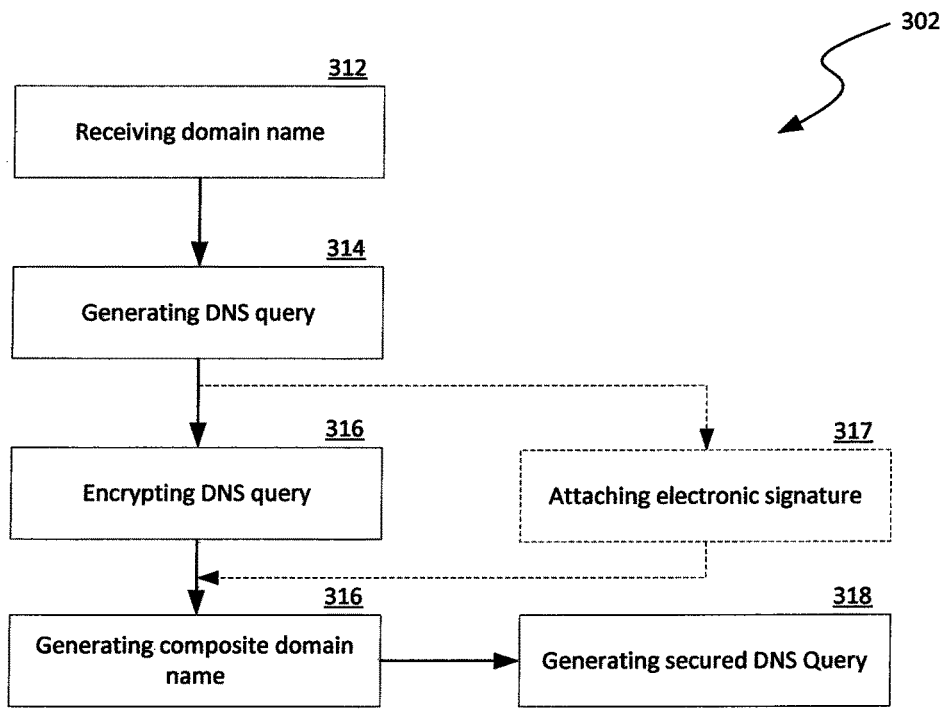

FIG. 5B is a flow diagram illustrating embodiments of a process 302 of generating a secured DNS query in accordance with embodiments of the disclosed technology. As shown in FIG. 5B, the process 302 can include receiving a domain name at stage 312. The domain name can be related to a website, an email server, or other suitable network resources. The process 302 can also include generating a DNS query for the received domain name at stage 314. An example data structure for the generated DNS query is shown in FIGS. 4A and 4B.

The process 302 can then include encrypting the generated DNS query at stage 316 and optionally attaching an electronic signature at stage 317, as described in more detail above with reference to FIGS. 1-3. The process 302 can also include generating a composite domain name at stage 316. Based on the composite domain name, the process 302 can then include generating the secured DNS query for resolving the composite domain name at stage 318.

Figure 5C:
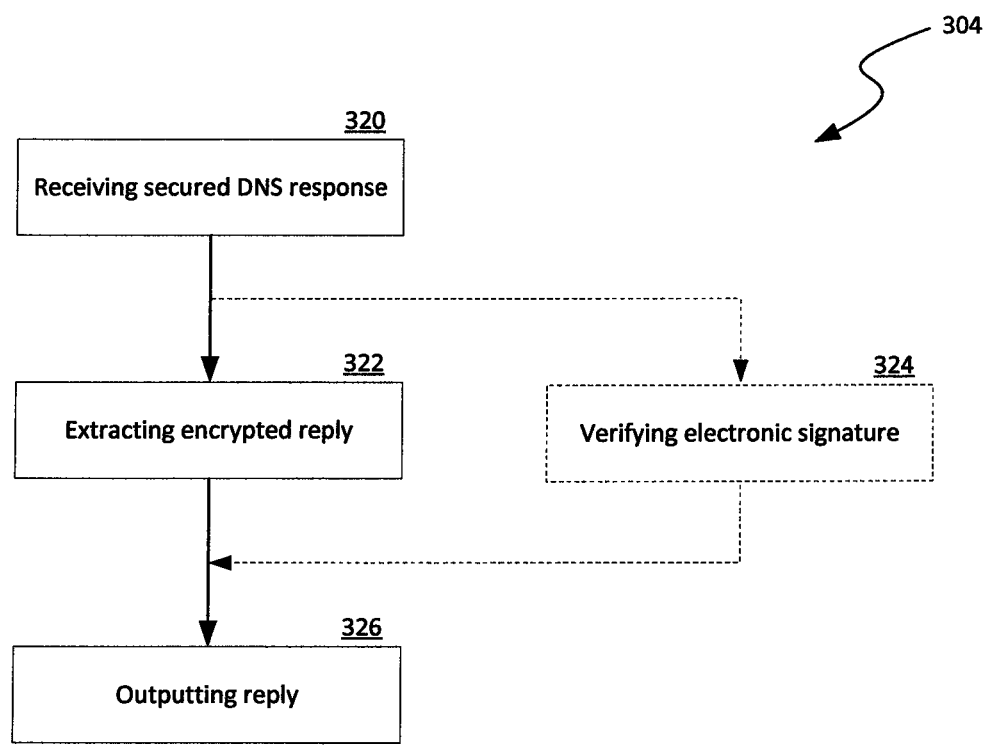

FIG. 5C is a flow diagram illustrating embodiments of a process 304 of processing a secured DNS response in accordance with embodiments of the disclosed technology. As shown in FIG. 5C, the process 304 can include receiving the secured DNS response from a caching server (e.g., the untrusted caching server 112 of FIG. 1) at stage 320. The process 304 can then include extracting an encrypted reply at stage 322. In certain embodiments, the entire secured DNS response is encrypted. Thus, extracting the encrypted reply can include decrypting the entire DNS response using one or more cryptography keys 111 in FIG. 1. In other embodiments, the secured DNS response includes encrypted data in the response data field 218 (FIG. 4C). Thus, extracting the encrypted reply can include extracting data from the response data filed 218 and decrypt the extracted data. Optionally, the process 304 can also include verifying an electronic signature attached to the encrypted reply at stage 324. The process 304 can then include outputting the decrypted reply (e.g., a resource record 116 in FIG. 1) at stage 326.

Figure 6A:
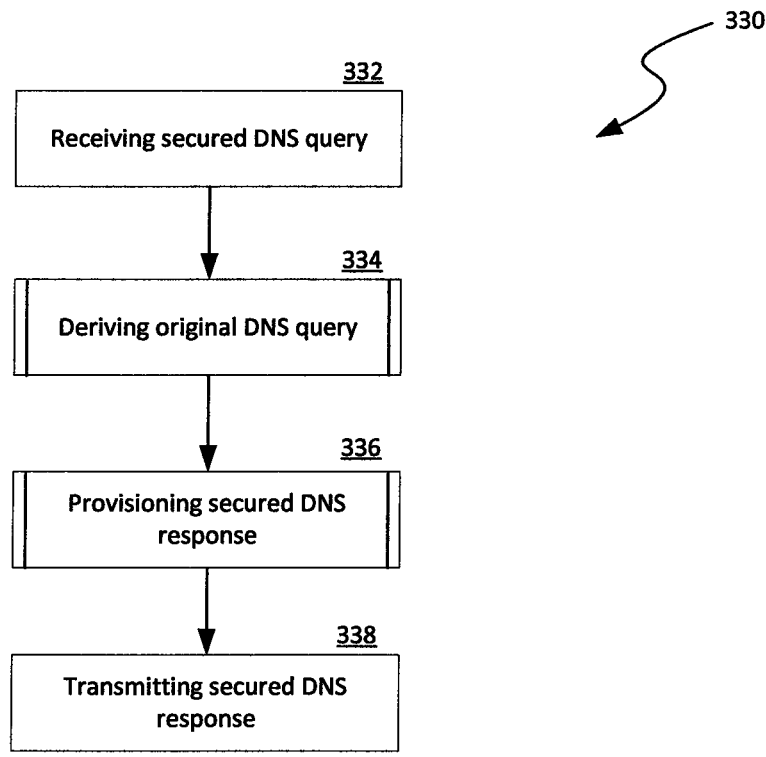
FIGS. 6A-6C are flow diagrams illustrating embodiments of a process of secured name resolution at a caching server in accordance with embodiments of the disclosed technology.

FIG. 6A is a flow diagram illustrating embodiments of a process 330 of secured name resolution at a caching server in accordance with embodiments of the disclosed technology. As shown in FIG. 6A, the process 330 can include receiving a secured DNS query at stage 332. The secured DNS query can include a first part having an encrypted request and a second part having an unencrypted network resource identifier. The process 330 can then include deriving an original DNS query from the received secured DNS query at stage 334. Example processes suitable for deriving the original DNS query are describe in more detail below with reference to FIG. 6B.

The process 330 can then include provisioning a secured DNS response in response to the received secured DNS query at stage 336. The secured DNS contains an encrypted reply to the encrypted request in the first part of the domain name associated with the secured DNS query. Example processes suitable for deriving the original DNS query are describe in more detail below with reference to FIG. 6C. The process 330 can then include transmitting the secured DNS response to, for example, the untrusted caching server 112 in FIG. 1, at stage 338.

Figure 6B:
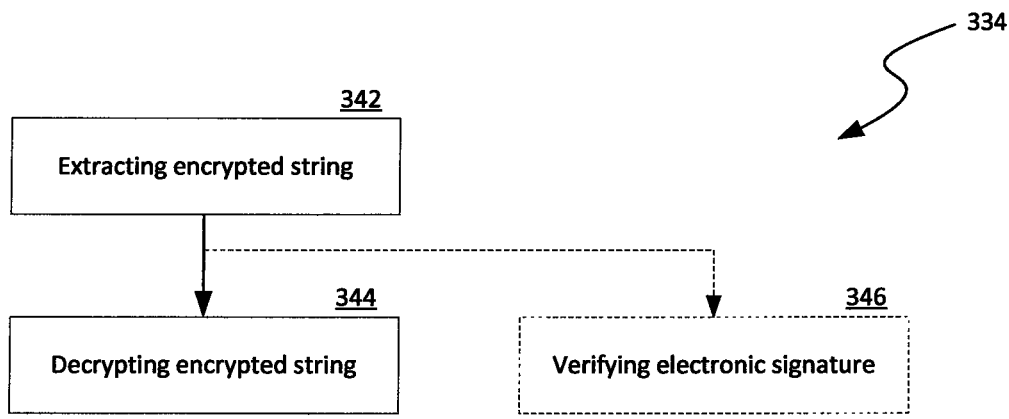

FIG. 6B is a flowchart illustrating an example process 334 for deriving the original DNS query from the secured DNS query. As shown in FIG. 6B, the process 334 can include extracting an encrypted string from a domain name contained in the secured DNS query. The encrypted string can be identified by delimiters, characters lengths, character patterns, and/or other suitable criteria. The process 334 can then include decrypting the encrypted string at stage 344 using, for example, one or more of the cryptography keys 111 in FIG. 1. Optionally, the process 334 can also include verifying an electronic signature attached to the encrypted string to determine or verify that the DNS query originated from, for instance, the client device 102 in FIG. 1.

Figure 6C:
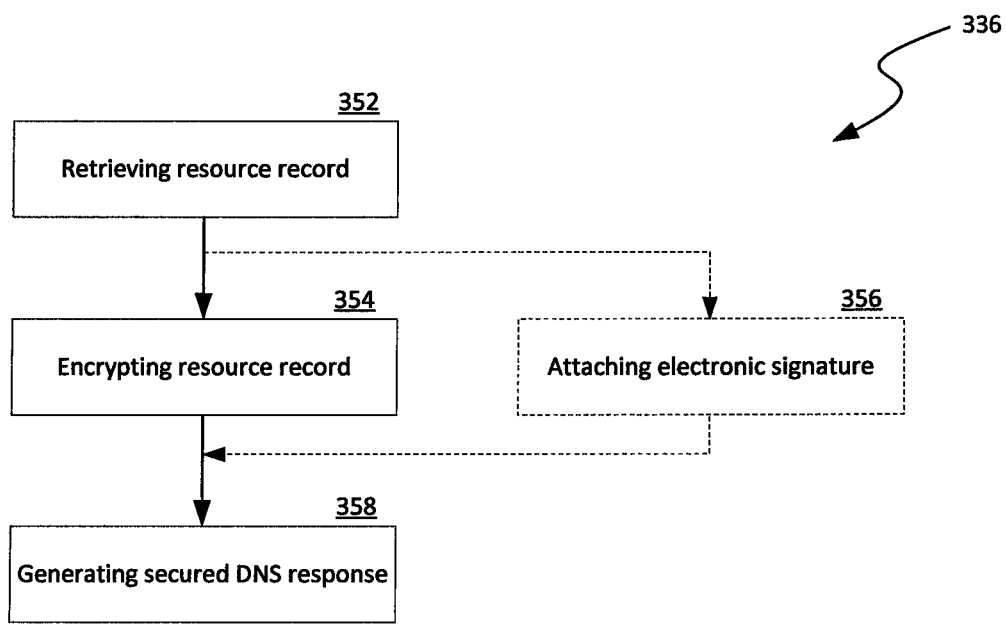

FIG. 6C is a flowchart illustrating an example process 336 for provisioning the secured DNS response. As shown in FIG. 6C, the process 336 can include retrieving a resource record 116 (FIG. 1) from, for example, the DNS cache 114 or the authoritative nameservers 130 of FIG. 1. The process 336 can then include encrypting the retrieved resource record at stage 354 using, for example, one of the cryptography keys 111 of FIG. 1. Optionally, the process 336 can also include generating and attaching an electronic signature to the encrypted resource record at stage 356. The process 336 can then include generating a secured DNS response at stage 358, for example, based on the data structure shown in FIG. 4C.

Figure 7A:
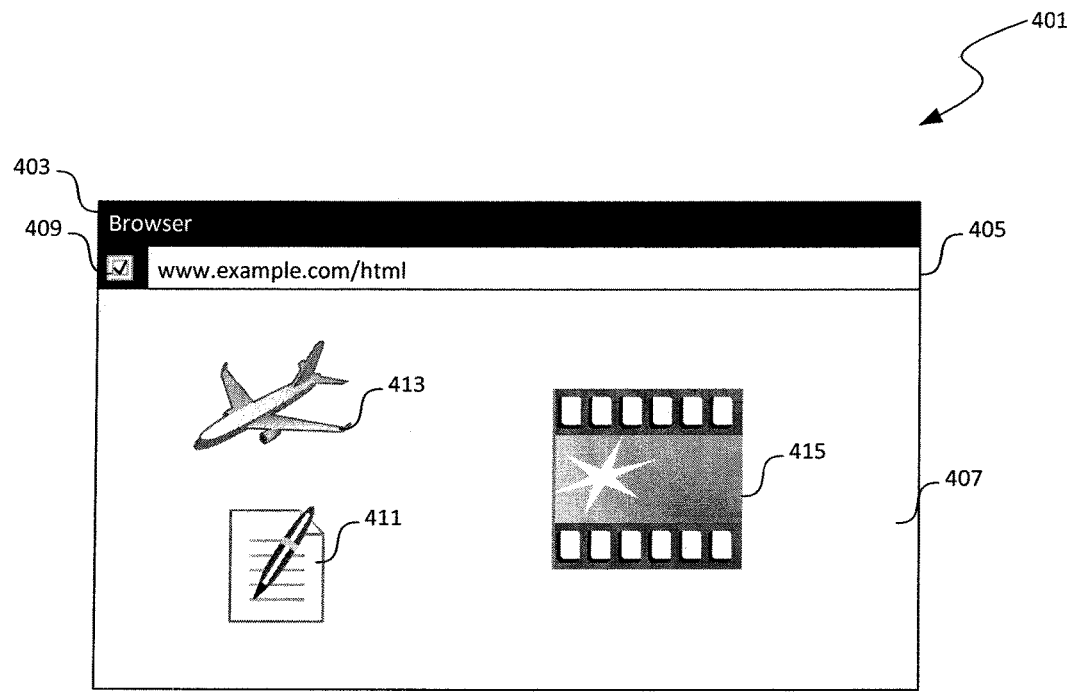
FIGS. 7A-7B are example user interfaces of a client device with secure or insecure DNS resolution, respectively, in accordance with embodiments of the disclosed technology.
Figure 7B:
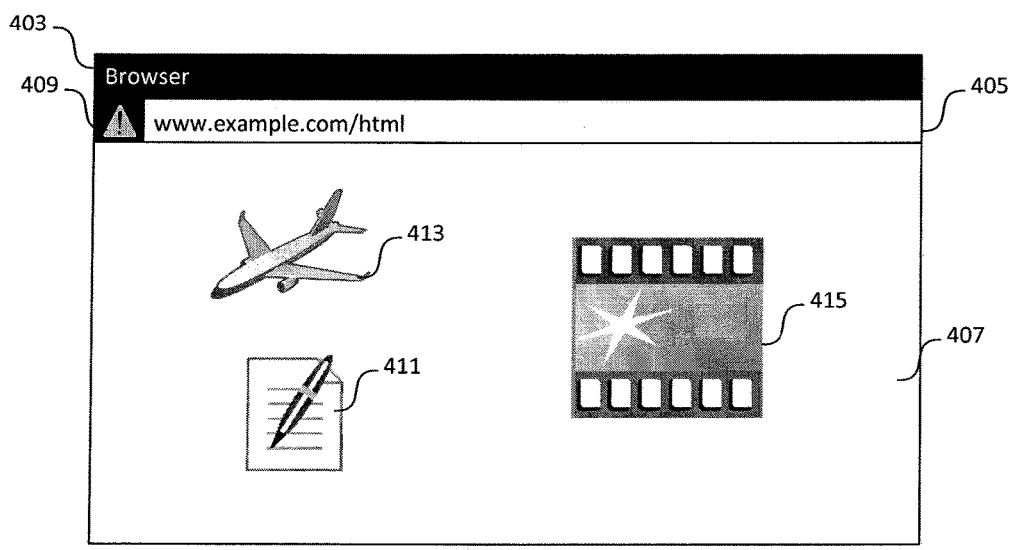

FIGS. 7A-7B are example user interfaces 401 of a client device 102 with secure or insecure DNS resolution, respectively, in accordance with embodiments of the disclosed technology. As shown in FIG. 7A, the user interface 401 can include a title bar 403, an address bar 405, and a content display area 407. The title bar 403 can be configured to identify a currently executing application (e.g., a browser). The address bar 405 can be configured to display an URL of a website (e.g., "www.example.com/html"). And the content display area 407 can be configured to display text 411, photos 413, videos 415, and/or other suitable types of content associated with the website.

As shown in FIG. 7A, the user interface 401 can also include an indicator display 409 indicating whether DNS resolution is currently secure. For example, in the illustrated embodiment in FIG. 6A, the indicator display 409 includes a check mark indicating that DNS resolution for the website is secure. In the illustrated embodiment of FIG. 7B, a warning sign is displayed to indicate that the DNS resolution for the website is not currently secure.

FIG. 8 is a computing device 400 suitable for certain components of the computing framework 100 in FIGS. 1-3. For example, the computing device 400 may be suitable for the level-1 nameserver 136, level-2 nameserver 138, the client device 102, the untrusted caching server 112, or the trusted caching server 122 of FIG. 1. In a very basic configuration 402, computing device 400 typically includes one or more processors 404 and a system memory 406. A memory bus 408 may be used for communicating between processor 404 and system memory 406.

Depending on the desired configuration, the processor 404 may be of any type including but not limited to a microprocessor (μP), a microcontroller (μC), a digital signal processor (DSP), or any combination thereof. The processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, the system memory 406 may be of any type including but not limited to volatile memory (such as RAM), non-volatile memory (such as ROM, flash memory, etc.) or any combination thereof. The system memory 406 can include an operating system 420, one or more applications 422, and program data 424. As shown in FIG. 8, in certain embodiments, the application 422 may include, for example, the interface component 162, the query component 164, the cryptography component 166, as described in more detail above with reference to FIG. 3. In other embodiments, the application 422 can also include other suitable components. The program data 424 may include, for example, the resource records 116 and the cryptography keys 111. This described basic configuration 402 is illustrated in FIG. 9 by those components within the inner dashed line.

The computing device 400 may have additional features or functionality, and additional interfaces to facilitate communications between basic configuration 402 and any other devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436, and non-removable storage devices 438 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 400. Any such computer readable storage media may be a part of computing device 400. The term "computer readable storage medium" excludes propagated signals and communication media.

The computing device 400 may also include an interface bus 440 for facilitating communication from various interface devices (e.g., output devices 442, peripheral interfaces 444, and communication devices 446) to the basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A method for name resolution in a domain name system ("DNS"), the method comprising:
transmitting, from a client device, a DNS query containing a domain name to a caching server for resolving the domain name, wherein the domain name includes a first part having an encrypted DNS request and a second part having an unencrypted network resource identifier corresponding to a resource record identifying a trusted caching server having a verified security credential in relation to the client device, wherein the transmitted DNS query is transmitted with an attached digital signature of the client device for authenticating to the trusted caching server that the encrypted DNS request originates from the client device; and
receiving, at the client device, a DNS response from the caching server in response to the transmitted DNS query, the received DNS response containing an encrypted reply to the encrypted request in the first part of the domain name associated with the DNS query.

2. The method of claim 1 wherein:
transmitting the DNS query includes transmitting, from the client device, the DNS query to a first caching server; and
the second part of the domain name contains an unencrypted network resource identifier of a second caching server different than the first caching server.

3. The method of claim 1 wherein:
the DNS query is a first DNS query;
the domain name is a first domain name; and
the encrypted DNS request includes an encrypted second DNS query containing a second domain name different than the first domain name.

4. The method of claim 1 wherein:
the DNS query is a first DNS query;
the domain name is a first domain name;
the encrypted DNS request includes an encrypted second DNS query containing a second domain name different than the first domain name; and
the encrypted reply includes an encrypted resource record corresponding to the second domain name in the encrypted request.

5. The method of claim 1 wherein:
the DNS query is a first DNS query;
the domain name is a first domain name;
the caching server is first caching server; and
the method further includes:
generating a second DNS query containing a second domain name different than the first domain name; and
encrypting the generated second DNS query using a public key of a second caching server to generate the first part of the first DNS query, the second caching server being different than the first caching server.

6. The method of claim 1 wherein:
the DNS query is a first DNS query;
the domain name is a first domain name;
the caching server is first caching server; and
the method further includes:
generating a second DNS query containing a second domain name different than the first domain name;
encrypting the generated second DNS query using a public key of a second caching server to generate the first part of the first domain name, the second caching server being different than the first caching server; and
electronically signing the generated first part of the first domain name using a private key of the client device.

7. The method of claim 1 wherein:
the DNS query is a first DNS query;
the domain name is a first domain name;
the caching server is first caching server; and
the method further includes:
generating a second DNS query containing a second domain name different than the first domain name; and
encrypting the generated second DNS query using an encryption key to generate the first part of the first domain name, the encryption key being shared between the client device and a second caching server different than the first caching server.

8. The method of claim 1 wherein:
the caching server is a first caching server; and
the method further includes:
  decrypting the encrypted reply in the DNS response using a private key of the client device; and
  validating the encrypted reply using a public key of a second caching server different than the first caching server.

9. The method of claim 1 wherein:
the DNS query is a first DNS query;
the domain name is a first domain name;
the caching server is first caching server; and
the method further includes:
  generating a second DNS query containing a second domain name different than the first domain name;
  encrypting the generated second DNS query using an encryption key to generate the first part of the first domain name, the encryption key being shared between the client device and a second caching server different than the first caching server; and
  decrypting the encrypted reply in the DNS response using the encryption key shared between the client device and the second caching server.

10. A computing system for name resolution in a domain name system ("DNS"), the computing system having a processor and memory containing instructions that when executed by the processor cause the processor to perform a process that includes:
  receiving, at the computing system, a DNS query for resolving a domain name, wherein the domain name includes a first part having an encrypted DNS request and a second part having an unencrypted network resource identifier, wherein the received DNS query has an attached digital signature from a client device;
  at the computing system, using the attached digital signature to authenticate that the encrypted DNS request in the first part of the received DNS query originates from the client device; and
  upon authenticating that the encrypted DNS request in the first part of the received DNS query originates from the client device, generating and transmitting, from the computer system, a DNS response in response to the received DNS query, the transmitted DNS response containing an encrypted reply to the encrypted DNS request in the first part of the domain name associated with the received DNS query.

11. The computing system of claim 10 wherein:
receiving the DNS query includes receiving, at the computing system, the DNS query from a caching server; and
the second part of the domain name contains an unencrypted network resource identifier corresponding to the computing system.

12. The computing system of claim 10 wherein:
the DNS query is a first DNS query;
the domain name is a first domain name; and
the encrypted request includes an encrypted second DNS query containing a second domain name different than the first domain name.

13. The computing system of claim 10 wherein:
the DNS query is a first DNS query;
the domain name is a first domain name;
the encrypted DNS request includes an encrypted second DNS query containing a second domain name different than the first domain name; and
the encrypted reply includes an encrypted resource record corresponding to the second domain name in the encrypted DNS request.

14. The computing system of claim 10 wherein:
the DNS query is a first DNS query;
the domain name is a first domain name; and
the process performed by the processor further includes:
  extracting the first part from the first domain name associated with the first DNS query; and
  decrypting the encrypted DNS request in the extracted first part to generate a second DNS query containing a second domain name different than the first domain name.

15. The computing system of claim 10 wherein:
the DNS query is a first DNS query;
the domain name is a first domain name; and
the process performed by the processor further includes:
  extracting the first part from the first domain name associated with the first DNS query; and
  decrypting the encrypted DNS request in the extracted first part to generate a second DNS query containing a second domain name different than the first domain name; and
  verifying that the decrypted first part is from the client device using a public key associated with the client device.

16. The computing system of claim 10 wherein:
the DNS query is a first DNS query;
the domain name is a first domain name; and
the process performed by the processor further includes:
  extracting the first part from the first domain name associated with the first DNS query; and
  decrypting the encrypted DNS request in the extracted first part using an encryption key to generate a second DNS query containing a second domain name different than the first domain name, the encryption key being shared between a client device and the computing system.

17. The computing system of claim 10, further comprising:
  encrypting the reply to generate the encrypted reply using a public key of the client device; and
  electronically signing the encrypted reply using a private key of the computing system.

18. The computing system of claim 10 wherein:
the DNS query is a first DNS query;
the domain name is a first domain name; and
the process performed by the processor further includes:
  decrypting the encrypted DNS request using a private key of the computing system to generate a second DNS query containing a second domain name different than the first domain name;
  verifying that the decrypted first part is from the client device using a public key associated with the client device;
  obtaining a resource record corresponding to the second domain name in the second DNS query;
  encrypting the obtained resource record using the public key of the client device; and
  electronically signing the encrypted reply using a private key of the computing system.

19. A method for name resolution in a domain name system ("DNS"), the method comprising:
  receiving, at a client device and from a user, a request to access a network resource identified by a domain name;
  encrypting, at the client device, an original DNS query containing the domain name identifying the network resource using a public key of a trusted caching server to generate an encrypted string, the trusted caching server having a verified security credential in relation to the client device and a private key useful for decrypting the encrypted string;

creating a composite domain name by appending an unencrypted network resource identifier of at least a partial domain name corresponding to a resource record identifying the trusted caching server to the encrypted string;

generating a secured DNS query containing (i) the composite domain name and (ii) an attached electronic signature generated by the client device using a private key of the client device for authenticating to the trusted caching server that the encrypted original DNS request indeed originates from the client device;

transmitting the generated secured DNS query to an untrusted caching server for resolving the composite domain name; and receiving, at the client device, a DNS response from the caching server in response to the transmitted secured DNS query, the received DNS response containing an encrypted reply to the encrypted original DNS query in the first part of the composite domain name in the secured DNS query.

20. The method of claim 19 wherein:

the received DNS response is received with another attached electronic signature; and the method further includes:

using a public key of the trusted caching server and the another electronic signature, determining whether the encrypted reply is indeed from the trusted caching server; and in response to determining that the encrypted reply is indeed from the trusted caching server, decrypting the encrypted reply using a private key associated with the client device.

* * * * *